United States Patent [19]

Rivkin et al.

[11] Patent Number: 4,533,288

[45] Date of Patent: Aug. 6, 1985

[54] DRIVE FASTENER

[75] Inventors: Bernard W. Rivkin, Poway; Michael R. Monfort, Ramona, both of Calif.

[73] Assignee: P.P.M.D., San Diego, Calif.

[21] Appl. No.: 403,054

[22] Filed: Jul. 29, 1982

[51] Int. Cl.³ .............................................. F16B 13/06
[52] U.S. Cl. ................................... 411/176; 411/181; 411/448; 411/495; 411/459; 411/394; 29/526 R
[58] Field of Search ............ 411/29, 30, 166, 176–184, 411/187, 107, 385, 394, 396, 397, 447, 448, 459, 460, 457, 471, 473, 475, 474, 469, 222, 480, 489, 492, 493, 495, 496, 472; 29/432, 526 R

[56] References Cited

U.S. PATENT DOCUMENTS

| 412,831 | 10/1889 | Bower | 411/495 |
|---|---|---|---|
| 422,843 | 3/1890 | Smith | 411/472 |
| 584,158 | 6/1897 | Gordon | 411/222 |
| 847,888 | 3/1907 | Birdsall | 411/459 |
| 945,370 | 1/1910 | Braddock | 411/383 |
| 1,112,849 | 10/1914 | Sertell et al. | 411/448 |
| 1,741,279 | 12/1929 | Bowman | 411/471 |
| 2,329,744 | 9/1943 | Clarke | 411/495 |
| 2,528,685 | 11/1950 | Brown | 411/472 |
| 3,715,952 | 2/1973 | Fischer | 411/29 |

FOREIGN PATENT DOCUMENTS

| 156680 | 11/1932 | Switzerland | 411/459 |
|---|---|---|---|
| 823461 | 11/1959 | United Kingdom | 411/394 |

Primary Examiner—Thomas J. Holko
Assistant Examiner—Neill Wilson
Attorney, Agent, or Firm—Frank D. Gilliam

[57] ABSTRACT

A drive fastener designed to be hammered into penetrable material. One end of the drive fastener is split. The opposite end of the drive fastener contains threads. A pair of nuts are threaded together on the threaded end of the drive fastener to receive the impact of a hammering device for driving the fastener into penetrable material. When being driven, the split end spreads while penetrating to secure the fastener in place. The nuts are then removed and a single nut may be used to secure an object to the set fastener.

6 Claims, 15 Drawing Figures

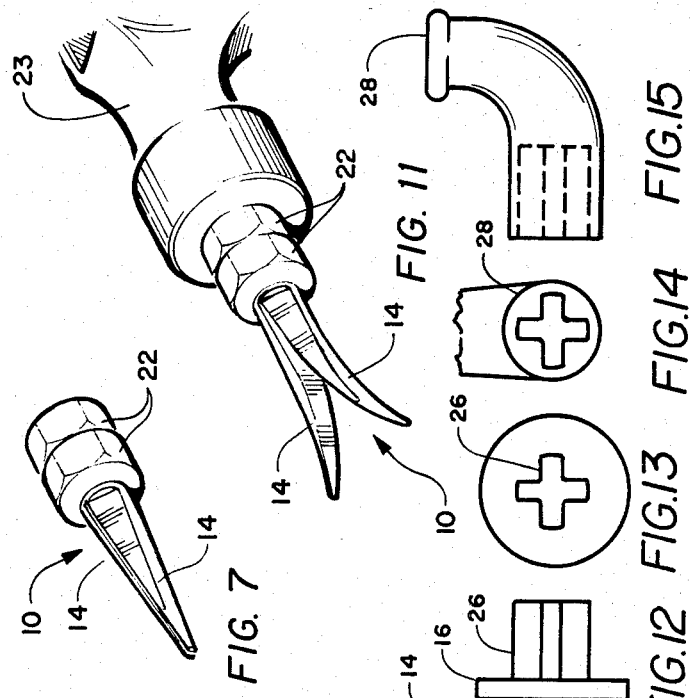

DRIVE FASTENER

BACKGROUND OF THE INVENTION

The present invention generally relates to fasteners, and particularly to a wall fastener which can be driven into penetrable material such as wood, plastic, plasterboard or the like, and which includes a bifurcated end of which the two legs spread as the fastener is driven, providing a convenient means for securing the fastener to the material in which it is driven.

Generally, prior art anchors which are to be driven into wall materials, such as plasterboard, have either been complex in construction and therefore costly to manufacture, inconvenient to use, or have failed to be fully effective insofar as the retentive power of the anchor is concerned once the latter penetrates the wall or surface.

An example of a prior art diverse type is fully described in U.S. Pat. No. 3,895,773, issued July 22, 1975. This fastener has one obvious drawback; if it is not positioned properly when driven into the wall or object, it will not properly align when twisted, that is the object supporting hook will not be in a plumb position. In the case where the fastener will not be turned enough for proper locking when the hook is plumb will result in a loose or insecure fastener and, likewise, will be loose when the fastener must be turned to align the hook plumb.

There has not been an entirely successful drive fastener until the emergence of the instant invention.

SUMMARY OF THE INVENTION

Accordingly, it is an object of the present invention to provide a drive fastener which does not have the above disadvantages associated with prior art wall fasteners.

It is another object of the present invention to provide a drive fastener which is simple in construction and economical to manufacture.

It is still another object of the present invention to provide a drive fastener that is not turned or twisted after it is driven in place.

It is a further object of the present invention to provide a drive fastener which has a bifurcated penetrating end whereby the bifurcations spread as the fastener is driven into an object and the fastener is secured to the object thereby.

A first embodiment of the present invention includes an elongated shank with one end bifurcated into two sections and the opposite end threaded for receiving at least one nut. A collar or shoulder is positioned therebetween. The distal tip of the bifurcated portion is curvilinear when viewed from the side. The end of each section has a flat outer surface and a curvilinear, cupped inner surface. Where the inner and outer surfaces join at the tip, a knife edge is formed. The length of the threaded end is such that a pair of back-to-back jam nuts threaded thereon extend at least slightly beyond the outer end of the threaded shaft portion. This feature allows the end surface of the outermost nut to be struck with a hammer or the like for setting the fastener while the end of the shank is not damaged thereby.

When the fastener is driven into a wall or the like, the penetrating sections spread in opposite directions and continue to do so until the fastener is set with the collar or shoulder against the outer surface of the material in which it is driven. After the fastener is set, the jam nuts are removed with a pair of wrenches or the like in a conventional manner. An object can then be attached to the fastener by passing it over the threaded end and a single nut can then be used to secure the object to the fastener as required.

In a second embodiment, the fastener takes a similar shape, except that the collar or shoulder is omitted from the shank and the bifurcated portion is terminated at substantially a point. The operation of setting and attaching an object to the set fastener of the second embodiment follows that of the hereinbefore described first embodiment.

BRIEF DESCRIPTION OF THE DRAWINGS

With the above and additional objects and advantages in view, as will hereinafter appear, this invention comprises the devices, combinations and arrangements of parts thereinafter described by way of example and illustrated in the accompanying drawings of preferred embodiments in which:

FIG. 1 is a perspective view of a first drive fastener in accordance with the present invention;

FIG. 2 is a plan view thereof;

FIG. 3 is a side view thereof;

FIG. 4 is a view of FIG. 2 taken along line 4—4;

FIG. 5 is a showing of the configuration of the drive fastener of the invention after it has been driven into penetrable material by a driving means;

FIG. 6 is a cutaway plan view of the fastener of the invention having been driven into and secured by a penetrable member;

FIG. 7 is a perspective view of a second embodiment of the invention;

FIG. 8 is a plan view of the second embodiment;

FIG. 9 is a side view of the second embodiment;

FIG. 10 is a showing of FIG. 8 taken along line 10—10;

FIG. 11 is a showing of the configuration of the drive fastener of the second embodiment after it has been driven into penetrable material by a driving means;

FIG. 12 depicts a second embodiment of the driven end of the drive fastener;

FIG. 13 is an end view of the second embodiment of the driven end of the drive fastener of FIG. 12;

FIG. 14 is an end view of the hook adapter shown in FIG. 15; and

FIG. 15 is a hook adapter which adapts to the driven end of the drive fastener of FIG. 12.

DESCRIPTION OF THE PREFERRED EMBODIMENTS

Referring now to the figures, wherein identical or similar parts or elements are designated by the same reference numerals throughout, and first referring to FIGS. 1–4, a drive fastener in accordance with a first embodiment of the present invention is generally designated by the reference numeral 10.

The drive fastener 10 is shown including a bifurcated end portion having a pair of sides 14, shoulder or collar 16 and a thread end portion 18. The distal end of the sides 14 have a vertical convex outer edges with a concave surface 20 therebetween; their outer longitudinal surface is flat and their inner longitudinal surface is curvilinear. The joiner of the inner and outer longitudinal surfaces and the vertical end surface of the distal ends of the sides 14 form a knife edge. A pair of nuts 22 are threadly engaged on the thread portion 18 for the purpose of protecting the distal end of the threaded portion when hammering the drive fastener 10 into penetrable material 24 (see FIGS. 5 and 6). These nuts 22 are installed and removed by conventional means, such as, but not limited to, wrenches, pliers or the like. A single nut may be used to secure an object to a set fastener.

As shown in FIGS. 5 and 6, as the fastener is hammered or driven into penetrable material by a hammer 23, the sides 14 drift apart sufficiently to hold the fastener into the object in which it is driven, as well as preventing movement of the fastener, such as rotating when the nuts are removed or replaced. Although two nuts are shown in the various described and yet to be described figures, a single elongated nut could be used, or the length of the threaded portion could be shortened to practice the invention.

Referring now to FIGS. 7-11, a second embodiment of the drive fastener 10 of the invention is shown. In this embodiment, the bifurcated portions of the shank which form the sides 14 are longitudinally tapered to substantially a point at their distal ends. The sides 14, as well as being pointed, are substantially triangular in cross section rather than rectangular as in the first embodiment (see FIG. 4). This embodiment does not include the shoulder or collar 16 positioned between the penetrating end and threaded end of the fastener. In this embodiment, a single nut 22 would not be as suitable for the purpose of driving the fastener into the penetrable material as would two nuts jammed together, as the shoulder, against which a signal nut could be secured is not available. FIGS. 6 and 11 show the condition of the sides 14 when driven into the penetrable material 24.

A second embodiment of the drive fastener is shown in FIG. 12. In this embodiment the driven end does not include threaded end such as 18. The driven end of this embodiment has a mate end 26 view configuration for mating with a female opening of a hook adapter 28. The only requirement for the mating configuration is that the hook is unable to rotate from its installed position. In this embodiment, the fastener 10 may be set by either hammering directly against end 26 or may be set by slipping a tubular member (not shown) over the end 26 and hammering on the opposite end of the tubular member against shoulder or collar 16.

Various different types of material could be utilized to form the various constituent components of the device. The selection of material is limited only to materials which would allow the device to satisfy the intent of the invention.

Numerous alterations of the structure herein disclosed will suggest themselves in those skilled in the art. However, it is to be understood that the present disclosure relates to preferred embodiments of the invention which is for the purpose of illustration only and is not be construed as a limitation of the invention.

What is claimed is:

1. An improved drive fastener comprising:
   an elongated shank having a bifurcated end portion, the open distal end of said bifurcated end portion positioned at one end thereof and suitable for being driven into penetrable material and a threaded portion positioned at the opposite end of said shank; and
   impact absorbing means comprising back-to-back nuts removably threaded on said threaded portion in a locked-together position and extending at least to the outer end thereof for receiving blows suitable for driving said drive fastener into penetrable material, the force of said blows causing the sides of said bifurcated end portion to spread apart as said fastener is driven into said penetrable material whereby the threaded portion of said fastener is not affected thereby.

2. The invention as defined in claim 1 wherein a shoulder is positioned on said shank between said split end portion and said threaded portion, said impact absorbing means is removably positioned in an abutting relationship with said shoulder and extends from said threaded end.

3. The invention as defined in claim 1 wherein said sides of said split end portion are substantially triangular in cross-section.

4. The invention as defined in claim 1 wherein the outer surfaces of said split end portion are inwardly directed toward said open distal end whereby a pointed end with a flat inner surface is formed on each side of said open distal end.

5. The invention as defined in claim 1 wherein the outer surfaces of said sides are flat and the inner longitudinal tip surfaces are curvilinear, whereby knife edges are formed at the tips of said outer surfaces.

6. The invention as defined in claim 1 wherein the vertical end tips of the sides of said split end portion are convex on their outer edges with a concave portion therebetween.

* * * * *